United States Patent Office 2,714,112
Patented July 26, 1955

2,714,112

PROCESS FOR THE MANUFACTURE OF UNSATURATED COMPOUNDS OF THE ANDROSTANE SERIES

Karl Miescher, Riehen, and Albert Wettstein and Karl Heusler, Basel, Switzerland, assignors to Ciba Pharmaceutical Products, Inc.

No Drawing. Application July 3, 1952,
Serial No. 297,176

Claims priority, application Switzerland July 6, 1951

5 Claims. (Cl. 260—397.1)

The present invention relates to a process for the manufacture of unsaturated compounds of the androstane series which contain, as the sole nuclear double bond, a double bond in the 7,8-position.

Various processes are known for the manufacture of unsaturated compounds of the steroid series which contain, as the sole double bond, a double bond in the 7,8-position. However, these known processes are inapplicable to compounds of the androstane series or give the desired products only in very low yield.

A primary object of the present invention is the embodiment of a process for the preparation, in excellent yields, of unsaturated compounds of the androstane series which contain, as the sole double bond, a double bond in the 7,8-position. Briefly stated, this object is realized according to the present invention by subjecting esters of aliphatic sulfonic acids with 7-hydroxy compounds of the androstane series which are saturated in the nucleus to the action of agents which are capable of splitting off an esterified hydroxyl with formation of a double bond.

The esters of aliphatic sulfonic acids used as starting materials are for example esters of alkane sulfonic acids, such as methanesulfonic acid, ethanesulfonic acid, propanesulfonic acid, etc., with 7-hydroxy-androstane compounds, and these esters may be further substituted in the nucleus, for example in 3-, 5-, 12-, 14-, 16-, 17-, and/or 17α-position. In particular they may contain, for example in 3- and 17-position, a free or functionally converted hydroxyl or keto group. They can however also be substituted, for example in 17-position, by a free or functionally converted carboxyl group, for example by an esterified carboxyl group, an acid amide or a nitrile group. Of especial importance are esters of 3,17-diacyloxy-7-hydroxy-androstanes, for example 3,17-diacetoxy-7-hydroxy-androstanes, 3,17-dipropionyloxy-7-hydroxy-androstanes or 3,17-dibenzoyloxy-7-hydroxy-androstanes, 3-keto-7-hydroxy-etiocholanic acids and their esters. In the above sense there are understood to be included among compounds of the androstane series also the stereoisomers or ring expansion or contraction products, for example D-homo-compounds, and derivatives with additional rings, such as i-compounds i. e. 3,5-cyclo-derivatives.

The splitting off, according to the present invention, of the 7-hydroxyl group esterified with an aliphatic sulfonic acid, can be effected by treatment with alkaline dehydrosulfonating agents, such as caustic alkalies, alkaline earths, carbonates, carboxylic acid salts, or organic bases, for example pyridine, collidine, dimethylaniline or piperidine.

The esters used as starting materials can advantageously be obtained in the following manner: A Δ$^5$-androstene compound is oxidized with tertiary butyl chromate: the double bond in the resultant Δ$^5$-7-keto-androstene is saturated with hydrogen, advantageously by means of catalytically activated hydrogen in the presence of a neutral organic solvent, as for example ethyl acetate; the obtained 7-keto-androstane is reduced to the 8-hydroxy-androstanes whereby the 7α-hydroxy-compound is produced as the main product; and the latter compound is esterified with the aliphatic sulphonic acid. Alternatively corresponding starting materials can also be produced by side chain degradation of bile acids containing a 7-hydroxyl group, for example of cholic acid, until the corresponding compound of the androstane series is produced, followed by partial conversion into the 7-sulphonic acid ester.

The compounds of the present invention are primarily useful as starting materials for the preparation of Δ$^{7,9(11)}$-androstadienes, which can be transformed into 11-keto compounds of the androstane series, which latter can be used for the production of cortisone (Δ$^4$-3,11,20-triketo-17α,21-dihydroxy-pregnene).

The following examples illustrate the invention, the relation between part by weight and part by volume being the same as that between gram and cubic centimeter. The radical of the formula $CH_3SO_2$— derived from methane sulphonic acid is conveniently designated as mesyl radical.

Example 1

A solution of 8.57 parts by weight of 3β,17β-diacetoxy-7α-mesyloxy-androstane in 29 parts by volume of pyridine and 29 parts by volume of toluene, is boiled for 16 hours under reflux. After cooling, the reaction mixture is diluted with ether, washed with dilute hydrochloric acid and water, dried and evaporated under reduced pressure. The crystalline residue obtained is Δ$^7$-3β,17β-diacetoxy-androstene, which after recrystallization from methanol, melts at 127–128° C.; [α]$_D$=—39° C. (in chloroform). The yield amounts to about 80 per cent.

In a completely analogous manner the 3α-acetoxy-7α-mesyloxy-etiocholanic acid methyl ester is converted into the Δ$^7$-3α-acetoxy-etiocholenic acid methyl ester.

The 3β,17β-diacetoxy-7α-mesyloxy-androstane used above can be obtained with advantage as follows:

5 parts by weight of Δ$^5$-3β,17β-diacetoxy-androstene are dissolved in 15 parts by volume of carbon tetrachloride and treated, while stirring at 70° C., with a mixture of 12.5 parts by volume of glacial acetic acid, 5 parts by volume of acetic anhydride and 35 parts by volume of a solution of tertiary butyl chromate in carbon tetrachloride which is free from tertiary butanol and is produced from 6.47 parts by weight of chromium trioxide. The reaction mixture is stirred for 8–10 hours at 70° C. After working up, 4.7 parts by weight are obtained of a crystalline crude product which, after recrystallization from ether, yields 3.1 parts by weight of pure Δ$^5$-3β-17β-diacetoxy-7-keto-androstene which melts at 215–217.5° C.

20 parts by weight of Δ$^5$-3β,17β-diacetoxy-7-keto-androstene are dissolved in 500 parts by volume of ethyl acetate and hydrogenated at room temperature (20–20° C.) in the presence of 0.5 part by weight of platinum oxide which has been previously treated with hydrogen. After the taking up of 1 mole of hydrogen, the hydrogenation is interrupted. After working up, there are obtained 18.5 parts by weight of pure 3β,17β-diacetoxy-7-keto-androstane which melts at 189–191.5° C.

35.76 parts by weight of 3β,17β-diacetoxy-7-keto-androstane are dissolved in 500 parts by volume of glacial acetic acid and hydrogenated at room temperature (20–30° C.) in the presence of 0.5 part by weight of platinum oxide which has been previously treated with hydrogen. After the taking up of the quantity of hydrogen calculated for 1 mol equivalent, the product is filtered from catalyst and the solution evaporated to dryness under reduced pressure. The residue, when recrystallized from ether or methanol, yields pure 3$\beta$,17$\beta$-diacetoxy-7$\alpha$-hydroxy-androstane which melts at 184.5–186° C.; [$\alpha$]$_D$=15° (in chloroform). The yield amounts to 90 per cent.

For the production of the 7-mesylate, 7 parts by weight of 3$\beta$,17$\beta$-diacetoxy-7$\alpha$-hydroxy-androstane are dissolved in 20 parts by volume of pyridine and the solution cooled to —15° C. and treated with a solution, cooled to —15° C., of 2.6 parts by weight of methane sulfonic acid chloride in 10 parts by volume of pyridine. Then the whole is allowed to stand at room temperature for 48 hours. Working up yields 8.6 parts by weight of crude 3$\beta$,17$\beta$-diacetoxy-7$\alpha$-mesyloxy-androstane which melts at 138–139° C. with decomposition. The pure substance obtained by recrystallization from methanol exhibits a melting point, depending upon the rapidity of the heating, between 120 and 140° C. with decomposition; [$\alpha$]$_D$=—27.5° (in chloroform). Higher alkane sulfonic acid esters can be produced in an analogous manner.

*Example 2*

A solution of 3.0 parts by weight of 3,17-diketo-7$\alpha$-mesyloxy-androstane in 10 parts by volume of pyridine and 10 parts by volume of toluene, is boiled for 12 hours under reflux. After cooling, the reaction mixture is diluted with ether, washed with dilute hydrochloric acid and water, dried and evaporated under reduced pressure. The residue obtained is $\Delta^7$-3,17-diketo-androstene.

*Example 3*

7.6 parts by weight of crude 3$\beta$,17$\beta$-diacetoxy-7$\alpha$-mesyloxy-androstane are dissolved in a mixture of 20 parts by volume of toluene and 20 parts by volume of freshly distilled 2,4,6-collidine and boiled under reflux for 12 hours with the exclusion of moisture. A dark colored oil separates during the reaction. After cooling the mixture is diluted with 130 parts by volume of ether, washed successively with water, dilute sulfuric acid, sodium bicarbonate solution and water, dried and evaporated under reduce pressure. The solid residue obtained (6.5 parts by weight) is recrystallized from methanol and yields 5.5 parts by weight of $\Delta^7$-3$\beta$,17$\beta$-diacetoxy-androstene of melting point 127–128° C.

*Example 4*

5 parts by weight of crude 3$\beta$,17$\beta$-diacetoxy-7$\alpha$-propane sulfonyloxy-androstane melting at 138–141° C. with decomposition are boiled under reflux for 15 hours in a mixture of 18 parts by volume of xylene and 18 parts by volume of collidine and worked up as indicated in Example 3. 3.2 parts by weight of $\Delta^7$-3$\beta$,17$\beta$-diacetoxy-androstene of melting point 127–128° C. are obtained.

*Example 5*

8.5 parts by weight of 3$\beta$,17$\beta$-dibenzoyloxy-7$\alpha$-ethane sulfonyloxy-androstane are suspended in a mixture of 30 parts by volume of absolute toluene and 30 parts by volume of collidine and refluxed for 12 hours under anhydrous conditions. After cooling the reaction mixture is diluted with 150 parts by volume of ether, washed with water, dilute sulfuric acid and water, dried and evaporated under reduced pressure. The crude solid residue obtained is recrystallized from ethyl acetate and yields 6.3 parts by weight of $\Delta^7$-3$\beta$,17$\beta$-dibenzoyloxy-androstene, which melts at 207.5–210.5° C. ([$\alpha$]$_D$= —4° in chloroform).

*Example 6*

2 parts by weight of 3$\beta$-acetoxy-7$\alpha$-mesyloxy-17-keto-androstane of melting point 122–126° (decomposition) are dissolved in a mixture of 5 parts by volume of toluene and 5 parts by volume of dimethylaniline and boiled under reflux for 15 hours. The dark brown solution is cooled and worked up exactly as indicated in Example 5. The semi-solid residue obtained is recrystallized from aqueous methanol whereby 1.1 part by weight of $\Delta^7$-3$\beta$-acetoxy-17-keto-androstene can be collected, which melt at 140–141°, [$\alpha$]$_D$=+33° in chloroform.

*Example 7*

3 parts by weight of 3$\beta$,17$\beta$-dipropionyloxy-7$\alpha$-mesyloxy-androstane are dissolved in a mixture of 15 parts by volume of toluene and 15 parts by volume of collidine and boiled under reflux for 10 hours. The reaction mixture is cooled and worked up exactly as described in Example 3. The semi-solid residue obtained (2.3 parts by weight) is dissolved in methanol and a solution of 3 parts by weight of potassium hydroxide in 10 parts by volume of water added. The reaction mixture is kept at 60° for 5 hours under a nitrogen atmosphere. Part of the methanol is removed under reduced pressure and the mixture diluted with water and thoroughly extracted with chloroform. The chloroform solutions are washed with saturated sodium chloride solution, dried and evaporated. The residue is recrystallized from methanol and yields the pure $\Delta^7$-3$\beta$,17$\beta$-dihydroxy-androstene, which melts at 190–192°; [$\alpha$]$_D$=—28° in chloroform.

What is claimed is:

1. A process for the preparation of unsaturated compounds of the androstane series with a double bond, which comprises subjecting an ester of an aliphatic sulfonic acid with a nuclearly saturated 7-hydroxy-androstane to the action of an alkaline dehydrosulfonating agent, whereby the esterified hydroxy group is split off at the 7-position and the hydrogen atom is eliminated at the 8-position, with formation of a 7,8-double bond.

2. A process for the preparation of unsaturated compounds of the androstane series with a double bond, which comprises subjecting an ester of an aliphatic sulfonic acid with a member selected from the group consisting of nuclearly saturated 7-hydroxy-androstane to the action of an organic base, whereby the esterified hydroxy group is split off at the 7-position and the hydrogen atom is eliminated, at the 8-position, with formation of a 7,8-double bond.

3. A process for the preparation of $\Delta^7$-3$\beta$,17$\beta$-diacetoxy-androstene which comprises treating 3$\beta$,17$\beta$-diacetoxy-7$\alpha$-mesyloxy-androstane with collidine, whereby the mesyloxy group is split off and the $\Delta^7$-3$\beta$,17$\beta$-diacetoxy-androstene is formed.

4. A process for the preparation of $\Delta^7$-3$\beta$-acetoxy-17-keto-androstene, which comprises treating 3$\beta$-acetoxy-17-keto-7$\alpha$-mesyloxy-androstane with dimethylaniline, whereby the mesyloxy group is split off and the $\Delta^7$-3$\beta$-acetoxy-17-androstene is formed.

5. A process for the preparation of $\Delta^7$-3$\alpha$-acetoxy-etiocholenic acid methyl ester, which comprises treating 3$\beta$-acetoxy-7$\alpha$-mesyloxy-etiochlolanic acid methyl ester with pyridine, whereby the mesyloxy group is split off and the $\Delta^7$-3$\alpha$-acetoxy-etiocholenic acid methyl ester is formed.

References Cited in the file of this patent

Helvita, Chim Acta, vol. 35, pp. 284–94 (1952).
Sobatka "Chem. of the Steroids," p. 164 (1938).